United States Patent
Ori

(10) Patent No.: US 9,297,989 B2
(45) Date of Patent: Mar. 29, 2016

(54) ZOOM LENS AND IMAGING APPARATUS

(71) Applicant: FUJIFILM Corporation, Tokyo (JP)

(72) Inventor: Tetsuya Ori, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/551,423

(22) Filed: Nov. 24, 2014

(65) Prior Publication Data

US 2015/0103412 A1   Apr. 16, 2015

Related U.S. Application Data

(63) Continuation of application No. PCT/JP2013/003005, filed on May 10, 2013.

(30) Foreign Application Priority Data

May 25, 2012  (JP) .................. 2012/119273

(51) Int. Cl.
*G02B 15/14* (2006.01)
*G02B 15/177* (2006.01)
*G02B 13/18* (2006.01)
(Continued)

(52) U.S. Cl.
CPC ............ *G02B 15/177* (2013.01); *G02B 13/006* (2013.01); *G02B 13/009* (2013.01); *G02B 13/0045* (2013.01); *G02B 13/18* (2013.01); *G02B 15/22* (2013.01)

(58) Field of Classification Search
CPC .. G02B 15/177; G02B 15/22; G02B 13/0045; G02B 13/006; G02B 13/009; G02B 13/18
See application file for complete search history.

(56) References Cited

U.S. PATENT DOCUMENTS 6,304,389 B1  10/2001  Shibayama
2001/0036020 A1  11/2001  Yamamoto
2002/0051301 A1  5/2002  Noguchi et al.
(Continued)

FOREIGN PATENT DOCUMENTS

DE  10 2011 115 239  3/2013
JP  09-21950  1/1997
(Continued)

OTHER PUBLICATIONS

International Search Report PCT/JP2013/003005 dated Sep. 24, 2013.
DE Office Action, dated Dec. 14, 2015; Application No. 11 2013 002 673.2.

*Primary Examiner* — Joseph P Martinez
(74) *Attorney, Agent, or Firm* — Young & Thompson

(57) ABSTRACT

A zoom lens substantially consists of a negative first lens group, a positive second lens group, and a positive third lens group; wherein
the first lens group substantially consists of a two negative lenses with concave surfaces toward the image side and a positive lens with a convex surface toward the object side;
the second lens group substantially consists of a stop; a positive lens with a convex surface toward the object side; a positive cemented lens, which is formed by a positive lens with a convex surface toward the object side and a negative lens with a concave surface toward the image side together; and a negative aspherical lens with a convex surface toward the image side; and
the third lens group substantially consists of a positive lens.

12 Claims, 11 Drawing Sheets

(51) Int. Cl.
  *G02B 13/00* (2006.01)
  *G02B 15/22* (2006.01)

(56) References Cited

U.S. PATENT DOCUMENTS

| | | |
|---|---|---|
| 2004/0076417 A1 | 4/2004 | Miyatake |
| 2006/0056047 A1 | 3/2006 | Oshita |
| 2009/0268308 A1 | 10/2009 | Masugi |
| 2012/0063004 A1 | 3/2012 | Saori |
| 2013/0250436 A1 | 9/2013 | Ori |

FOREIGN PATENT DOCUMENTS

| | | |
|---|---|---|
| JP | 2002-072091 | 3/2002 |
| JP | 3433734 | 5/2003 |
| JP | 2003-307677 | 10/2003 |
| JP | 2004-309951 | 11/2004 |
| JP | 2006-113554 | 4/2006 |
| JP | 4245783 | 1/2009 |
| JP | 2009-265171 | 11/2009 |
| JP | 2010-039016 | 2/2010 |
| JP | 2012-083706 | 4/2012 |
| WO | 02082158 | 10/2002 |
| WO | 2012066735 | 5/2012 |

FIG.6

EXAMPLE 1

WIDE ANGLE END

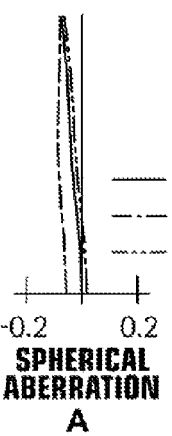

FNo.= 4.05

587.6nm
460nm
615nm

-0.2   0.2
SPHERICAL
ABERRATION
A

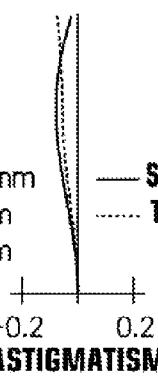

ω= 39.6°

SAGITTAL
TANGENTIAL

-0.2   0.2
ASTIGMATISM
B

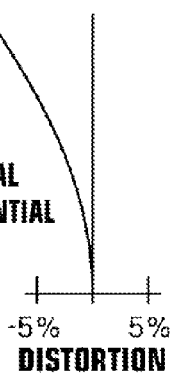

ω= 39.6°

-5%   5%
DISTORTION
C

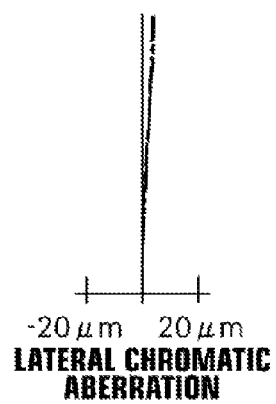

ω= 39.6°

-20μm   20μm
LATERAL CHROMATIC
ABERRATION
D

INTERMEDIATE

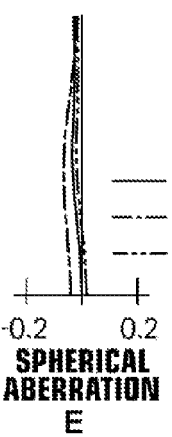

FNo.= 4.73

587.6nm
460nm
615nm

-0.2   0.2
SPHERICAL
ABERRATION
E

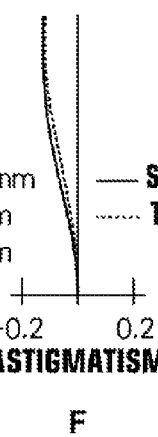

ω= 29.2°

SAGITTAL
TANGENTIAL

-0.2   0.2
ASTIGMATISM
F

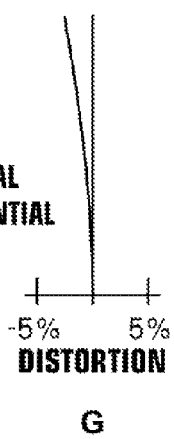

ω= 29.2°

-5%   5%
DISTORTION
G

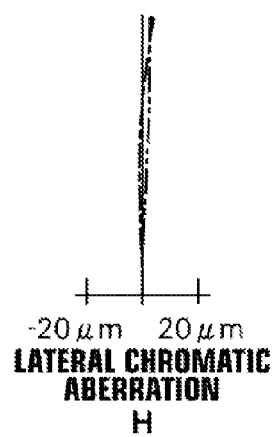

ω= 29.2°

-20μm   20μm
LATERAL CHROMATIC
ABERRATION
H

TELEPHOTO END

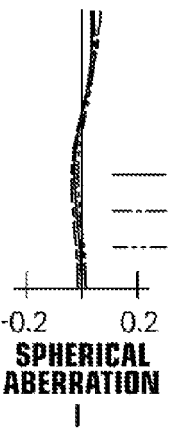

FNo.= 5.66

587.6nm
460nm
615nm

-0.2   0.2
SPHERICAL
ABERRATION
I

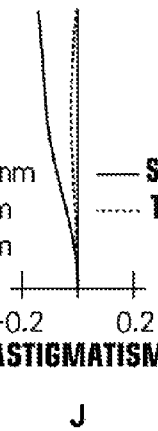

ω= 21.7°

SAGITTAL
TANGENTIAL

-0.2   0.2
ASTIGMATISM
J

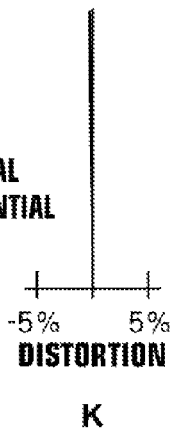

ω= 21.7°

-5%   5%
DISTORTION
K

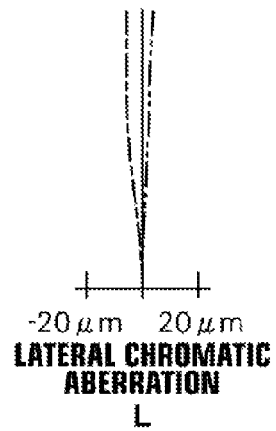

ω= 21.7°

-20μm   20μm
LATERAL CHROMATIC
ABERRATION
L

FIG.7
EXAMPLE 2
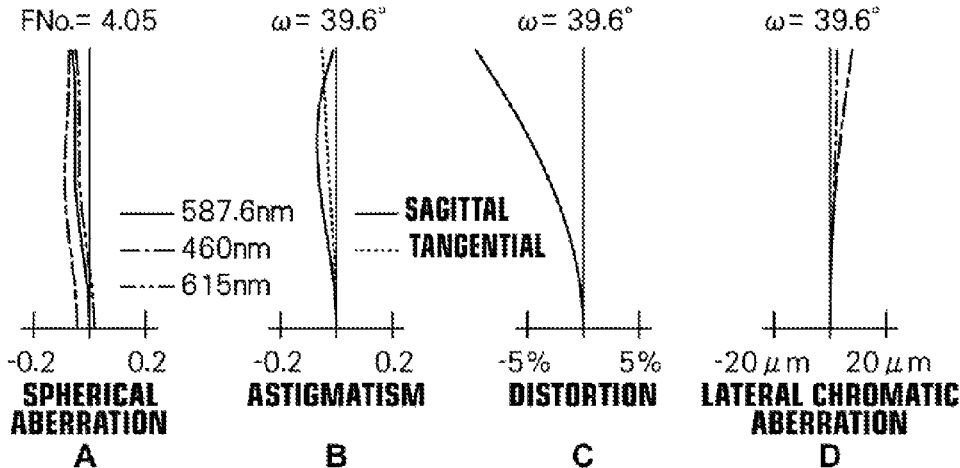
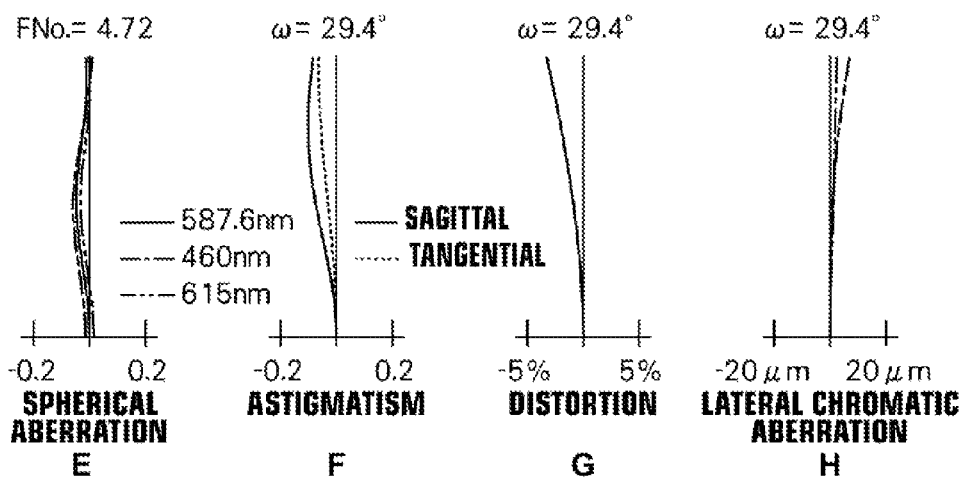
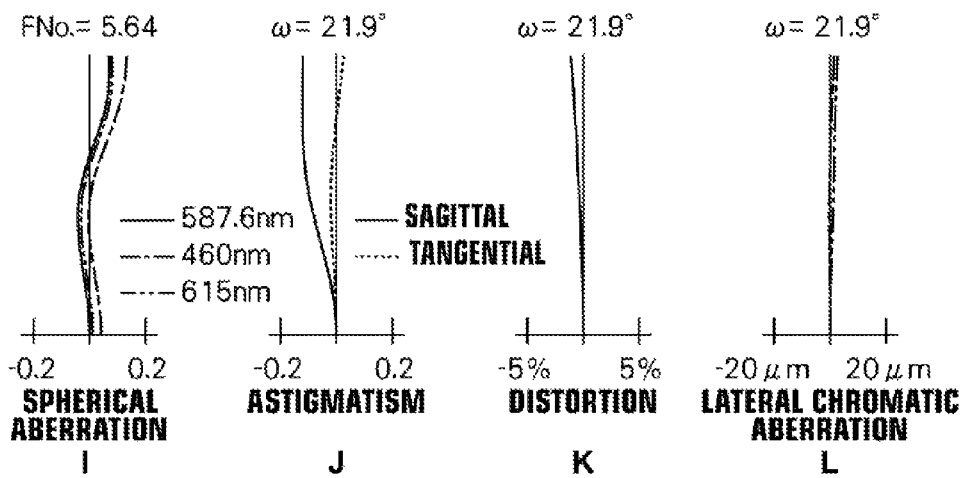

FIG.8

EXAMPLE 3

WIDE ANGLE END

FNo.= 3.98
— 587.6nm
—·— 460nm
—·· 615nm
-0.2  0.2
SPHERICAL ABERRATION
A

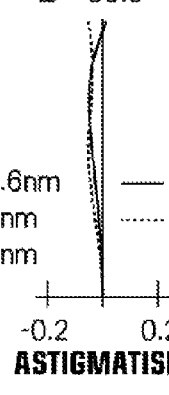
ω= 39.6°
— SAGITTAL
······ TANGENTIAL
-0.2  0.2
ASTIGMATISM
B

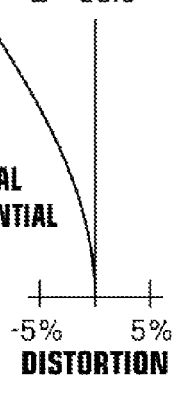
ω= 39.6°
-5%  5%
DISTORTION
C

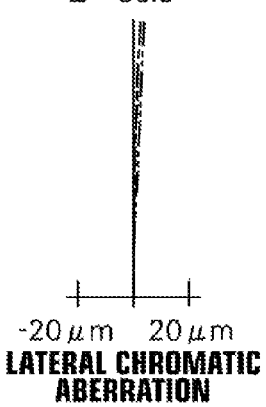
ω= 39.6°
-20μm  20μm
LATERAL CHROMATIC ABERRATION
D

INTERMEDIATE

FNo.= 4.66
— 587.6nm
—·— 460nm
—·· 615nm
-0.2  0.2
SPHERICAL ABERRATION
E

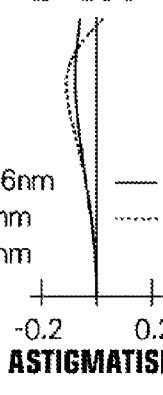
ω= 29.5°
— SAGITTAL
······ TANGENTIAL
-0.2  0.2
ASTIGMATISM
F

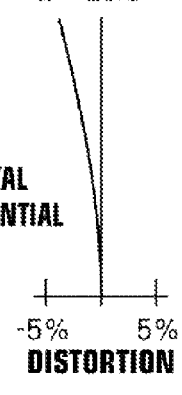
ω= 29.5°
-5%  5%
DISTORTION
G

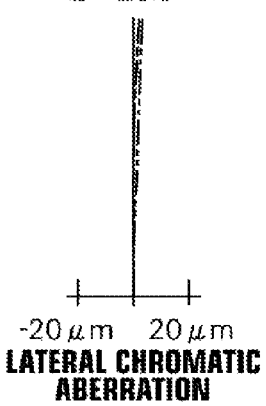
ω= 29.5°
-20μm  20μm
LATERAL CHROMATIC ABERRATION
H

TELEPHOTO END

FNo.= 5.61
— 587.6nm
—·— 460nm
—·· 615nm
-0.2  0.2
SPHERICAL ABERRATION
I

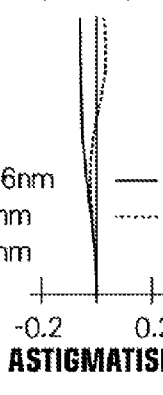
ω= 21.9°
— SAGITTAL
······ TANGENTIAL
-0.2  0.2
ASTIGMATISM
J

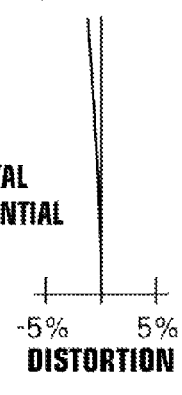
ω= 21.9°
-5%  5%
DISTORTION
K

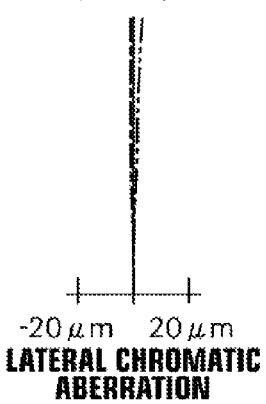
ω= 21.9°
-20μm  20μm
LATERAL CHROMATIC ABERRATION
L

FIG.9

EXAMPLE 4

WIDE ANGLE END

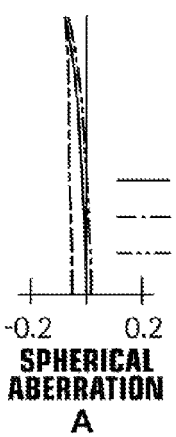
FNo.= 4.16
—— 587.6nm
—·— 460nm
—··— 615nm
-0.2  0.2
SPHERICAL ABERRATION
A

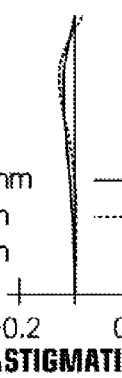
ω = 39.6°
—— SAGITTAL
······ TANGENTIAL
-0.2  0.2
ASTIGMATISM
B

ω = 39.6°
-5%  5%
DISTORTION
C

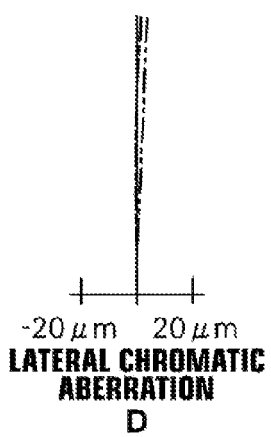
ω = 39.6°
-20 μm  20 μm
LATERAL CHROMATIC ABERRATION
D

INTERMEDIATE

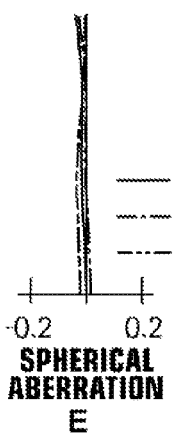
FNo.= 4.88
—— 587.6nm
—·— 460nm
—··— 615nm
-0.2  0.2
SPHERICAL ABERRATION
E

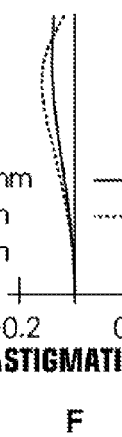
ω = 29.3°
—— SAGITTAL
······ TANGENTIAL
-0.2  0.2
ASTIGMATISM
F

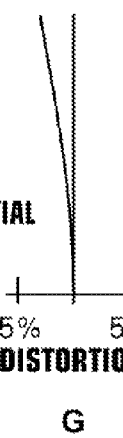
ω = 29.3°
-5%  5%
DISTORTION
G

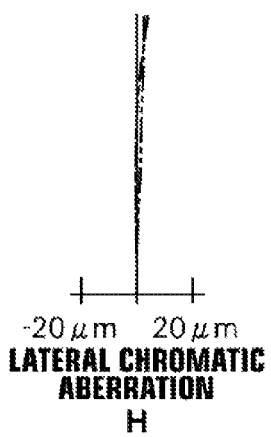
ω = 29.3°
-20 μm  20 μm
LATERAL CHROMATIC ABERRATION
H

TELEPHOTO END

FNo.= 5.86
—— 587.6nm
—·— 460nm
—··— 615nm
-0.2  0.2
SPHERICAL ABERRATION
I

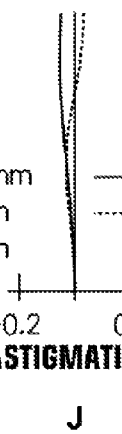
ω = 21.7°
—— SAGITTAL
······ TANGENTIAL
-0.2  0.2
ASTIGMATISM
J

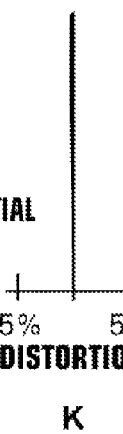
ω = 21.7°
-5%  5%
DISTORTION
K

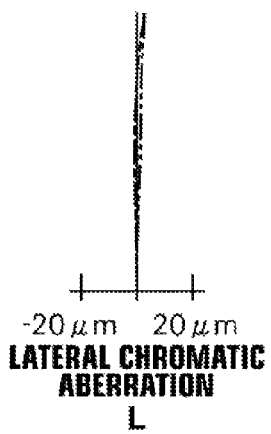
ω = 21.7°
-20 μm  20 μm
LATERAL CHROMATIC ABERRATION
L

FIG.10
EXAMPLE 5
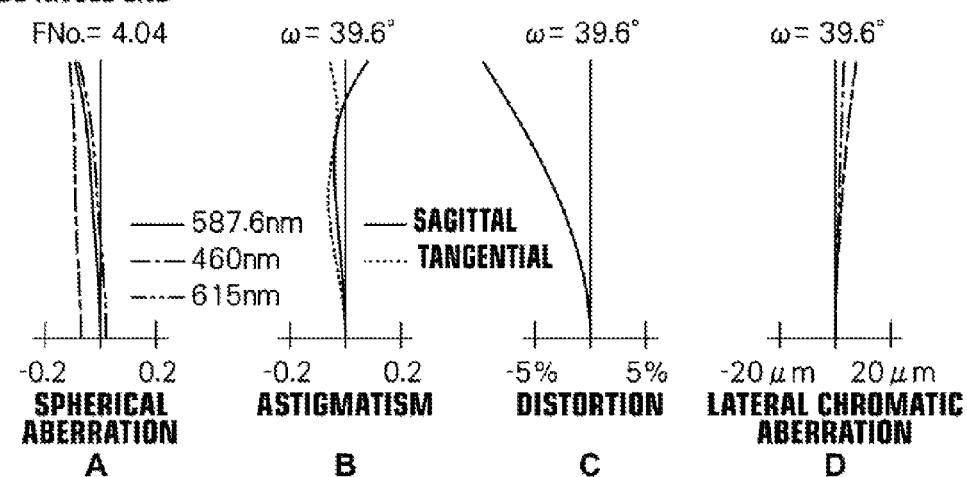
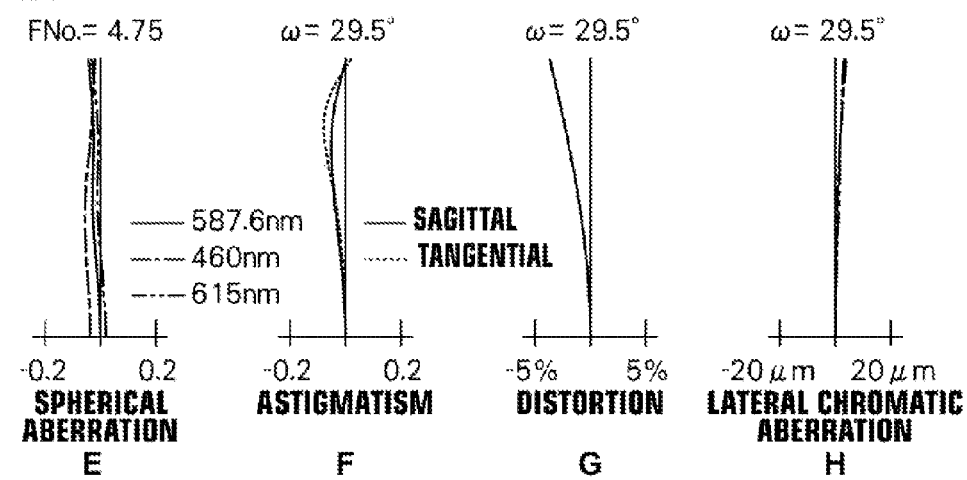
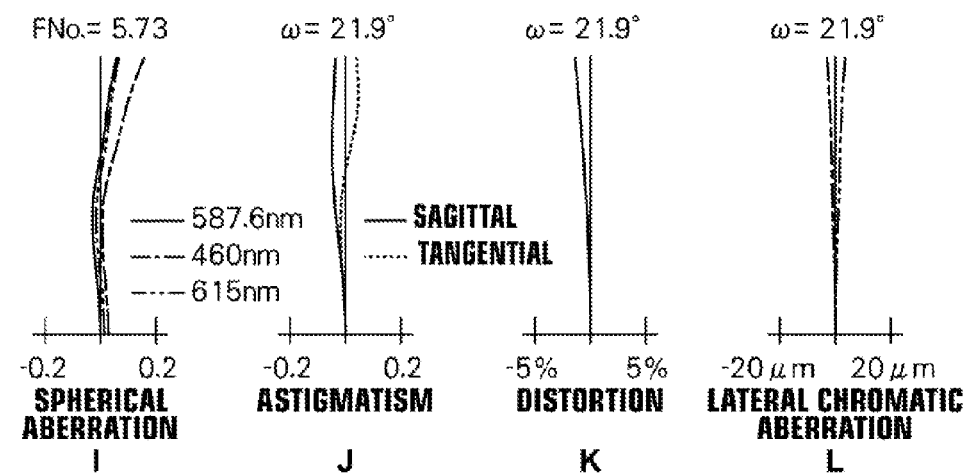

ZOOM LENS AND IMAGING APPARATUS

CROSS-REFERENCE TO RELATED APPLICATIONS

This application is a Continuation of PCT International Application No. PCT/JP2013/003005 filed on May 10, 2013, which claims priority under 35 U.S.C. §119(a) to Japanese Patent Application No. 2012-119273 filed on May 25, 2012. Each of the above application(s) is hereby expressly incorporated by reference, in its entirety, into the present application.

BACKGROUND OF THE INVENTION

1. Technical Field

The present invention relates to a zoom lens optimal for an interchangeable lens for a mirror-less camera, and an imaging apparatus including the zoom lens.

2. Description of the Related Art

In recent years, mirror-less cameras in which a mirror box that reflects light onto a finder is eliminated from a camera side have been available in the single-lens reflex camera filed. Such mirror-less cameras are advantageous from the viewpoint of shortening the total lens lengths because no mirror boxes are included therein such that the back focus of the interchangeable lenses can be shortened. Further, a configuration in which the tip of an interchangeable lens is slipped into the interior of the camera from a mount thereof is possible. A demand for compact lenses which utilize the advantages of such mirror-less cameras is recently increasing. In particular, a demand for zoom lenses which are likely to have long total lengths to be miniaturized is high. Further, a decrease in costs is also highly demanded.

The zoom lenses disclosed in Patent Documents 1 through 3 (Japanese Patent No. 3433734, Japanese Patent No. 4245783, and Japanese Unexamined Patent Publication No. 2003-307677) are known as three-group zoom type zoom lenses in which a negative lens group is disposed in front, which is suitable for meeting the demand for such a miniaturization and low costs.

SUMMARY OF THE INVENTION

The zoom lens disclosed in Patent Document 1 moves a first lens group having a negative refractive power, a second lens group having a positive refractive power, and a third lens group having a positive refractive power so as to change magnification. The first lens group consists of a negative lens, a negative lens and a positive lens in this order from the object side. The second lens group consists of a positive lens, a positive lens, a negative lens and a positive lens. The third lens group consists of a positive lens.

In the zoom lens disclosed in Patent Document 1, the most-image-side lens of the second lens group is a positive lens, which will decrease the refractive powers of the positive lenses disposed on the object side within the second lens group. This will cause the effective diameter of the second lens group to enlarge, thereby increasing the outer diameters of the lenses of the second lens group. Further, the position of a principal point of the second lens group will be at the image side. Thereby, there is a need to secure a wide distance between the first lens group and the second lens group at the telephoto end. Accordingly, it is difficult to shorten the total length of the lens.

The zoom lens disclosed in Patent Document 2 changes magnification by moving a first lens group having a negative refractive power, a second lens group having a positive refractive power, and a third lens group having a positive refractive power. The first lens group substantially consists of a negative lens, a negative lens, and a positive lens in this order from the object side. The second lens group substantially consists of a positive lens, a positive lens, a negative lens, and a negative lens. The third lens group substantially consists of a positive lens.

In the zoom lens disclosed in Patent Document 2, it is difficult to shorten the total length of the lens because the focal length of the second lens group is long with respect to the focal length of the entire zoom lens system. Further, there is a concern that moving the third lens group generates a flow of air around the imaging surface, resulting in adhesion of dust to the imaging surface. Further, the positive lens and the negative lens, which are respectively a second lens and a third lens in this order from the object side in the second lens group, are not cemented together to form a cemented lens. Therefore, there is a concern about deterioration in performance of the lens due to variance in the lens holding accuracy. Moreover, the fourth negative lens in the second lens group has a concave surface toward the image side. Therefore, it is difficult to correct field curvature and distortion and there is a concern about deterioration in the performance of the lens due to variance in the lens holding accuracy.

The zoom lens disclosed in Patent Document 3 changes magnification by moving a first lens group having a negative refractive power, a second lens group having a positive refractive power, and a third lens group having a positive refractive power. The first lens group substantially consists of a negative lens, a negative lens, and a positive lens in this order from the object side. The second lens group substantially consists of a positive lens, a positive lens, a negative lens, and a positive lens. The third lens group substantially consists of a positive lens.

In the zoom lens disclosed in Patent Document 3, the most-image-side lens of the second lens group is a positive lens, which will decrease the refractive powers of the positive lenses disposed on the object side within the second lens group. This will cause the effective diameter of the second lens group to enlarge, thereby increasing the outer diameters of the lenses of the second lens group.

The present invention has been developed in view of the above circumstances. It is an object of the present invention to provide a compact zoom lens optimal for an interchangeable lens for a mirror-less camera, and an imaging apparatus including the zoom lens.

A zoom lens of the present invention substantially consists of a first lens group having a negative refractive power, a second lens group having a positive refractive power, and a third lens group having a positive refractive power in this order from the object side, in which a stop is provided within the second lens group and only the first lens group and the second lens group are moved to change magnification; wherein the first lens group substantially consists of an L11 negative lens with a concave surface toward the image side, an L12 negative lens with a concave surface toward the image side, and an L13 positive lens with a convex surface toward the object side in this order from the object side;

the second lens group substantially consists of a stop, an L21 positive lens with a convex surface toward the object side, a cemented lens having a positive refractive power as a whole which is formed by an L22 positive lens with a convex surface toward the object side and an L23 negative lens with a concave surface toward the image side together, and an L24 negative lens with a convex surface toward the image side, having at least one aspherical surface, in this order from the object side; wherein the third lens group substantially consists of an L31 positive lens; and conditional formula below is satisfied:

$$1.85 < N13 \quad (8),$$ where

N13: the refractive index with respect to the d-line of the L13 positive lens.

It is preferable for the zoom lens of the present invention to satisfy the conditional formula below:

$$0.07 < D45/f2 < 0.20 \quad (1),$$ where

D45: the air space along the direction of the optical axis between the L21 positive lens and the L22 positive lens: and
f2: the focal length of the second lens group.

In this case, it is more preferable to satisfy conditional formula below:

$$0.09 < D45/f2 < 0.16 \quad (1a).$$

Further, it is preferable for conditional formulas below to be satisfied:

$$1.60 < |f1|/fw < 2.20 \quad (2)$$

$$0.85 < |f1|/ft < 1.20 \quad (3)$$

$$1.20 < f2/fw < 1.60 \quad (4)$$

$$0.60 < f2/ft < 0.90 \quad (5),$$ where fw: the focal length of the entire zoom lens system at the wide angle end;
ft: the focal length of the entire zoom lens system at the telephoto end;
f1: the focal length of the first lens group; and
f2: the focal length of the second lens group.

In this case, it is more preferable to satisfy conditional formulas below:

$$1.70 < |f1|/fw < 2.10 \quad (2a)$$

$$0.90 < |f1|/ft < 1.10 \quad (3a)$$

$$1.30 < f2/fw < 1.50 \quad (4a)$$

$$0.70 < f2/ft < 0.80 \quad (5a).$$

Further, it is preferable for conditional formulas below to be satisfied:

$$0.50 < BF/fw < 0.90 \quad (6)$$

$$0.25 < BF/ft < 0.45 \quad (7),$$ where fw: the focal length of the entire zoom lens system at the wide angle end;
ft: the focal length of the entire zoom lens system at the telephoto end; and
BF: the back focus of the entire lens system.

In this case, it is more preferable to satisfy conditional formulas below:

$$0.55 < BF/fw < 0.80 \quad (6a)$$

$$0.30 < BF/ft < 0.40 \quad (7a).$$

Further, it is more preferable to satisfy conditional formula below:

$$1.90 \leq N13 \quad (8a).$$

Further, it is preferable for conditional formulas below to be satisfied:

$$3.5 < Lw/fw < 5.0 \quad (9)$$

$$1.9 < Lt/ft < 2.7 \quad (10),$$ where fw: the focal length of the entire zoom lens system at the wide angle end;
ft: the focal length of the entire zoom lens system at the telephoto end;
Lw: the total lens length of the entire zoom lens system at the wide angle end; and
Lt: the total lens length of the entire zoom lens system at the telephoto end.

In this case, it is more preferable to satisfy conditional formulas below:

$$4.0 < Lw/fw < 4.5 \quad (9a)$$

$$2.1 < Lt/ft < 2.5 \quad (10a).$$

It is preferable for the first lens group to be moved so as to perform focusing to a close distance.

An imaging apparatus of the present invention is provided with the zoom lens of the present invention described above.

A zoom lens of the present invention substantially consists of a first lens group having a negative refractive power, a second lens group having a positive refractive power, and a third lens group having a positive refractive power in this order from the object side, in which a stop is provided within the second lens group and only the first lens group and the second lens group are moved to change magnification, wherein the first lens group substantially consists of an L11 negative lens with a concave surface toward the image side, an L12 negative lens with a concave surface toward the image side, and an L13 positive lens with a convex surface toward the object side in this order from the object side;

the second lens group substantially consist of a stop, a positive lens with a convex surface toward the object side, an L21 cemented lens having a positive refractive power as a whole which is formed by an L22 positive lens with a convex surface toward the object side and an L23 negative lens with a concave surface toward the image side together, and an L24 negative lens with a convex surface toward the image side, having at least one aspherical surface, in this order from the object side, wherein the third lens group substantially consists of an L31 positive lens.

This enables a compact zoom lens to be realized.

Further, the imaging apparatus of the present invention is provided with the zoom lens of the present invention. Accordingly, the imaging apparatus which is compact as a whole can be achieved.

BRIEF DESCRIPTION OF THE DRAWINGS

FIG. 6 shows aberration diagrams A through L of the zoom lens according to Example 1 of the present invention.

FIG. 7 shows aberration diagrams A through L of the zoom lens according to Example 2 of the present invention.

FIG. 8 shows aberration diagrams A through L of the zoom lens according to Example 3 of the present invention.

FIG. 9 shows aberration diagrams A through L of the zoom lens according to Example 4 of the present invention.

FIG. 10 shows aberration diagrams A through L of the zoom lens according to Example 5 of the present invention.

DESCRIPTION OF THE PREFERRED EMBODIMENTS

Figure 1:
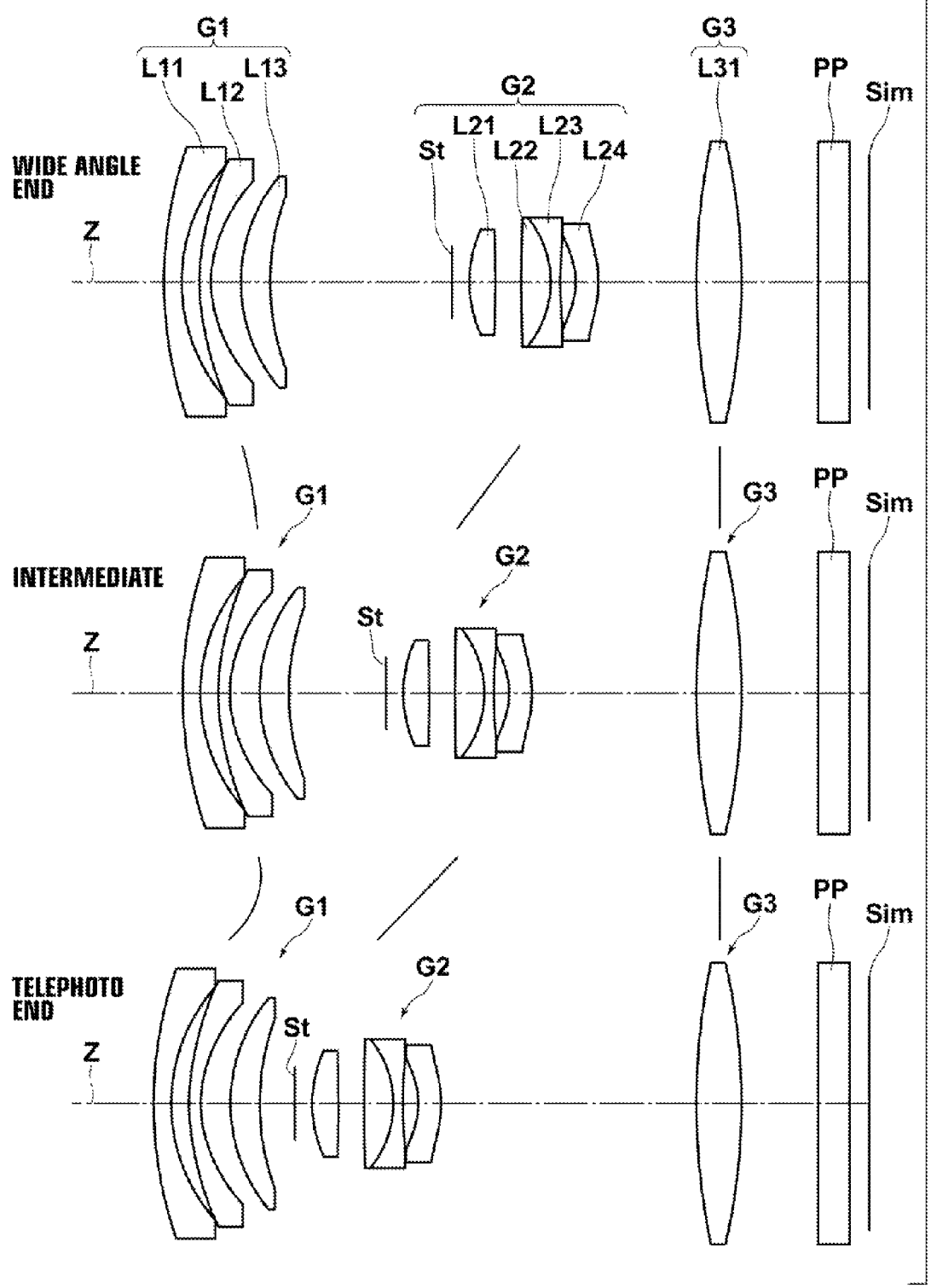
FIG. 1 is a collection of cross-sectional views of a zoom lens according to one embodiment (which is the same as Example 1) of the present invention, illustrating the lens configuration thereof.

Hereinafter, embodiments of the present invention will be described in detail with reference to the accompanying drawings. FIG. 1 is a collection of cross-sectional views of a zoom lens according to one embodiment of the present invention, illustrating the lens configuration thereof. The example of the configuration shown in FIG. 1 is the same as the configuration of the zoom lens of Example 1 to be described later. In FIG. 1, the left side is the object side, and the right side is the image side.

This zoom lens substantially consists of a first lens group G1 having a negative refractive power, a second lens group G2 having a positive refractive power, and a third lens group G3 having a positive refractive power in this order from the object side along the optical axis Z, in which a stop is provided within the second lens group G2 and the first lens group G1 and the second lens group G2 move so as to change magnification. Note that the aperture stop St shown in FIG. 1 does not necessarily represent the size or shape thereof, but represents the position thereof on the optical axis Z.

When this zoom lens is applied to the imaging apparatus, it is preferable for a cover glass, a prism, various types of filters, such as an infrared cut filter, a low-pass filter, and the like to be provided between the optical system and the image surface Sim according to the configurations of a camera on which the lens is mounted. FIG. 1 illustrates an example in which a plane parallel optical member PP that presumes such components is provided between the third lens group G3 and the image surface Sim. Note that the position, thickness or characteristic of the optical member PP is not limited, but should be considered according to the performance required of the imaging lens. Further, the optical member PP may not be provided.

In this manner, the first lens group G1, the second lens group G2, and the third lens group G3 are respectively configured to have a negative refractive power, a positive refractive power, and a positive refractive power; and only the first lens group G1 and the second lens group G2 are moved to change magnification from the wide angle toward the telephoto. This enables a configuration with a small number of lenses as a whole, i.e. eight lenses as described below and enables high magnification, miniaturization, and low costs to be achieved.

The first lens group G1 substantially consists of an L11 negative lens L11 with a concave surface toward the image side, an L12 negative lens L12 with a concave surface toward the image side, and an L13 positive lens L13 with a convex surface toward the object side in this order from the object side. This enables satisfactory correction of performance particularly at the wide angle side. Note that configuring an L11 lens and an L12 lens respectively to be a negative lens with a concave surface toward the image side and a negative lens with a concave surface toward the image side enable correction of field curvature and distortion. Further, configuring an L13 lens to be a positive lens with a convex surface toward the object side enables correction of lateral chromatic aberration.

The second lens group G2 substantially consists of a stop St, an L21 positive lens L21 with a convex surface toward the object side, a cemented lens having a positive refractive power as a whole formed by an L22 positive lens L22 with a convex surface toward the object side and an L23 negative lens L23 with a concave surface toward the image side in this order from the object side, and an L24 negative lens L24 having at least one aspherical surface with a convex surface toward the image side in this order from the object side. This enables correction of particularly spherical aberration, field curvature, and longitudinal chromatic aberration in the entire range of magnification change. Further, a lens configuration with a good workability can be obtained. Note that configuring the L21 lens to be a positive lens with a convex surface toward the object side enables correction of spherical aberration. Further, configuring the cemented lens to be formed by the L22 positive lens L22 with a convex surface toward the object side and the L23 negative lens L23 with a concave surface toward the image side together in this order from the object side enables correction of spherical aberration and lateral chromatic aberration. Further, deterioration in performance of the lens due to variance in the lens holding accuracy can be prevented. Moreover, configuring the L24 lens to be a negative lens having at least one aspherical surface with a convex surface toward the image side can correct spherical aberration and field curvature. Further, even in the case that the apex of the L24 negative lens L24 deviates from the optical axis (axis misalignment/decenter), deterioration in performance of the lens due to variance in the lens holding accuracy can be prevented because degradation in image quality at the peripheral angles of view is low.

The third lens group G3 substantially consists of an L31 positive lens L31. This can reduce the angle of light entering the image surface and can suppress shading. Further, fixing the positive lens L31 while changing magnification enables the amount of dust adhered to the image surface to be reduced.

Further, configuring the first lens group G1 to move when focusing to a close distance enables a configuration in which the fluctuations in aberrations during focusing operations is reduced. Further, disposing a driving system, which is necessary for feeding out the lens during focusing, on the side of the first lens group G1 enables the size of the lens barrel on the side of the lens mount to be miniaturized.

Conditional formula (1) below is related to the distance between the L21 positive lens L21 and the L22 positive lens L22 along the direction of the optical axis. Satisfying this formula enables miniaturization of the lens and satisfactory correction of aberration therein to be achieved.

$$0.07 < D45/f2 < 0.20 \quad (1),$$

where

D45: the air space along the direction of the optical axis between the L21 positive lens L21 and the L22 positive lens L22; and f2: the focal length of the second lens group.

Configuring the lens such that the value of D45/f2 is less than the lower limit defined by conditional formula (1) is advantageous from the viewpoint of miniaturization, but will make it difficult to correct field curvature and spherical aberration. Configuring the lens such that the value of D45/f2 is greater than the upper limit defined by conditional formula (1) is advantageous from the viewpoint of correcting field curvature, but will make it difficult to achieve miniaturization.

Note that satisfying conditional formula (1a) below enables further miniaturization of the lens and satisfactory aberration correction therein.

$$0.09 < D45/f2 < 0.16 \tag{1a}$$

Conditional formulas (2), (3), (4), and (5) below are related to the refractive powers of the first lens group G1 and the second lens group G2. Satisfying these formulas enables miniaturization of the lens and satisfactory correction of aberrations in the entire zooming range.

$$1.60 < |f1|/fw < 2.20 \tag{2}$$

$$0.85 < |f1|/ft < 1.20 \tag{3}$$

$$1.20 < f2/fw < 1.60 \tag{4}$$

$$0.60 < f2/ft < 0.90 \tag{5}$$

where fw: the focal length of the entire zoom lens system at the wide angle end;
ft: the focal length of the entire zoom lens system at the telephoto end;
f1: the focal length of the first lens group; and
f2: the focal length of the second lens group.

Conditional formulas (2) and (3) are related to the refractive power of the first lens group G1. Configuring the lens such that the values of |f1|/fw and |f1|/ft are less than the lower limits defined respectively by conditional formulas (2) and (3) is advantageous from the viewpoint of miniaturization of the lens, but will make it difficult to correct aberrations in the entire zooming range. Further, fluctuations in performance during focusing operations will increase. Configuring the lens such that the values of |f1|/fw and |f1|/ft are greater than the upper limits defined respectively by conditional formulas (2) and (3) is advantageous from the viewpoint of correcting aberrations in the entire zooming range and suppressing the fluctuations in performance during focusing operations, but will make it difficult to achieve miniaturization of the lens.

Conditional formulas (4) and (5) are related to the refractive power of the second lens group G2. Configuring the lens such that the values of f2/fw and f2/ft are less than the lower limits defined respectively by conditional formulas (4) and (5) is advantageous from the viewpoint of miniaturization of the lens. However, satisfactory correction of aberrations in the entire zooming range will be difficult. Configuring the lens such that the values of f2/fw and f2/ft are greater than the upper limits defined respectively by conditional formulas (4) and (5) is advantageous from the viewpoint of correcting aberrations in the entire zooming range, but achievement of miniaturization of the lens will be difficult.

Further, it is desirable for conditional formula below to be satisfied.

Note that satisfying conditional formulas (2a), (3a), (4a), and (5a) below enables further miniaturization of the lens and satisfactory correction of aberrations therein to be achieved.

$$1.70 < |f1|/fw < 2.10 \tag{2a}$$

$$0.90 < |f1|/ft < 1.10 \tag{3a}$$

$$1.30 < f2/fw < 1.50 \tag{4a}$$

$$0.70 < f2/ft < 0.80 \tag{5a}$$

Conditional formulas (6) and (7) below are related to back focus. In the case that the zoom lens is mounted onto a camera with a short flange back, satisfying these conditional formulas enables miniaturization of the lens to be achieved.

$$0.50 < BF/fw < 0.90 \tag{6}$$

$$0.25 < BF/ft < 0.45 \tag{7}$$

where fw: the focal length of the entire zoom lens system at the wide angle end;
ft: the focal length of the entire zoom lens system at the telephoto end; and
BF: the back focus of the entire lens system.

Although falling below the lower limits defined by conditional formulas (6) and (7) is advantageous from the viewpoint of miniaturization, back focus will become too short such that a low pass filter or an infrared ray cut-off filter cannot be disposed. Exceeding the upper limits defined by conditional formulas (6) and (7) will make it difficult to achieve miniaturization.

Note that satisfying conditional formulas (6a) and (7a) below enables further miniaturization of a camera provided with filters.

$$0.55 < BF/fw < 0.80 \tag{6a}$$

$$0.30 < BF/ft < 0.40 \tag{7a}$$

Conditional formula (8) below is related to the refractive index of the L13 positive lens L13. Satisfying this formula enables miniaturization of the lens and satisfactory correction of aberrations therein to be achieved.

$$1.85 < N13 \tag{8}$$

where

N13: the refractive index with respect to the d-line of the L13 positive lens L13.

Satisfying conditional formula (8) can increase the absolute value of radius of curvature of the lens and make the thickness of the lens thinner, thereby enabling achievement of miniaturization. Further, the Petzval sum will be made appropriate, thereby enabling satisfactory correction of field curvature.

Note that satisfying conditional formula (8a) below enables further achievement of miniaturization and aberration correction of the lens.

$$1.90 \leq N13 \tag{8a}$$

Conditional formulas (9) and (10) below are related to the total lens length and satisfying the conditional formulas enables miniaturization of the lens to be achieved.

$$3.5 < Lw/fw < 5.0 \tag{9}$$

$$1.9 < Lt/ft < 2.7 \tag{10}$$

where fw: the focal length of the entire zoom lens system at the wide angle end;
ft: the focal length of the entire zoom lens system at the telephoto end,
Lw: the total lens length of the entire zoom lens system at the wide angle end; and
Lt: the total lens length of the entire zoom lens system at the telephoto end.

When the values of Lw/fw and Lt/ft respectively fall below the lower limits defined by conditional formulas (9) and (10), miniaturization can be achieved but, a shutter space between the first lens group G1 and the second lens group G2 will be decreased. When the values of Lw/fw and Lt/ft respectively exceed the upper limit defined by conditional formulas (9) and (10), achievement of miniaturization of the lens will be difficult.

Satisfying conditional formulas (9a) and (10a) below realizes a further miniaturized lens while securing a shutter space.

$$4.0 < Lw/fw < 4.5 \quad (9a)$$

$$2.1 < Lt/ft < 2.5 \quad (10a).$$

In the present zoom lens, as a material disposed on the most-object side, in particular, a glass is preferably used, or a transparent ceramic may be employed.

Moreover, in the case that the present zoom lens is used in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

In the example of FIG. 1, the optical member PP is disposed between the lens system and the image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Figure 2:
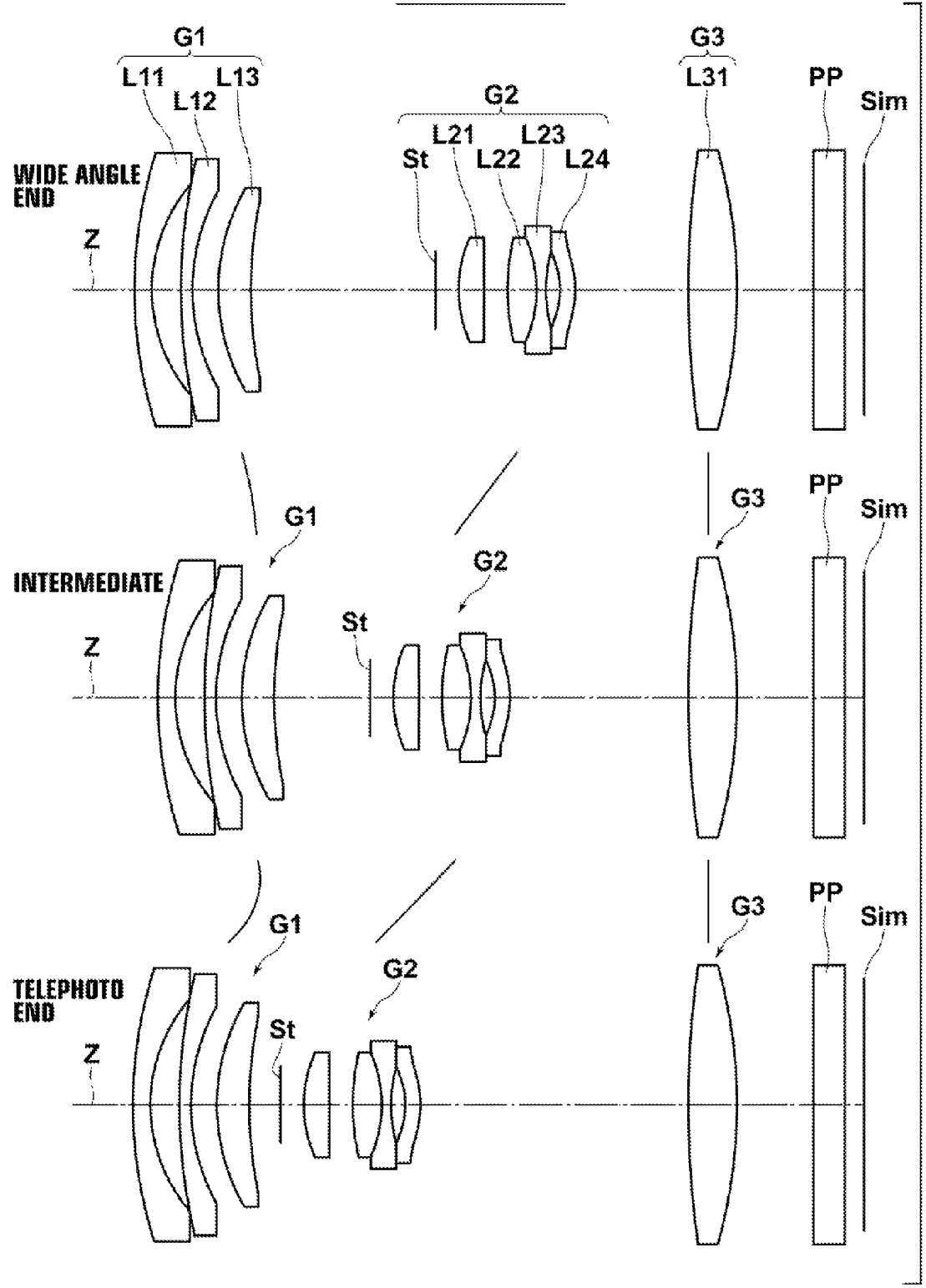
FIG. 2 is a collection of cross-sectional views of a zoom lens according to Example 2 of the present invention, illustrating the lens configuration thereof.
Figure 3:
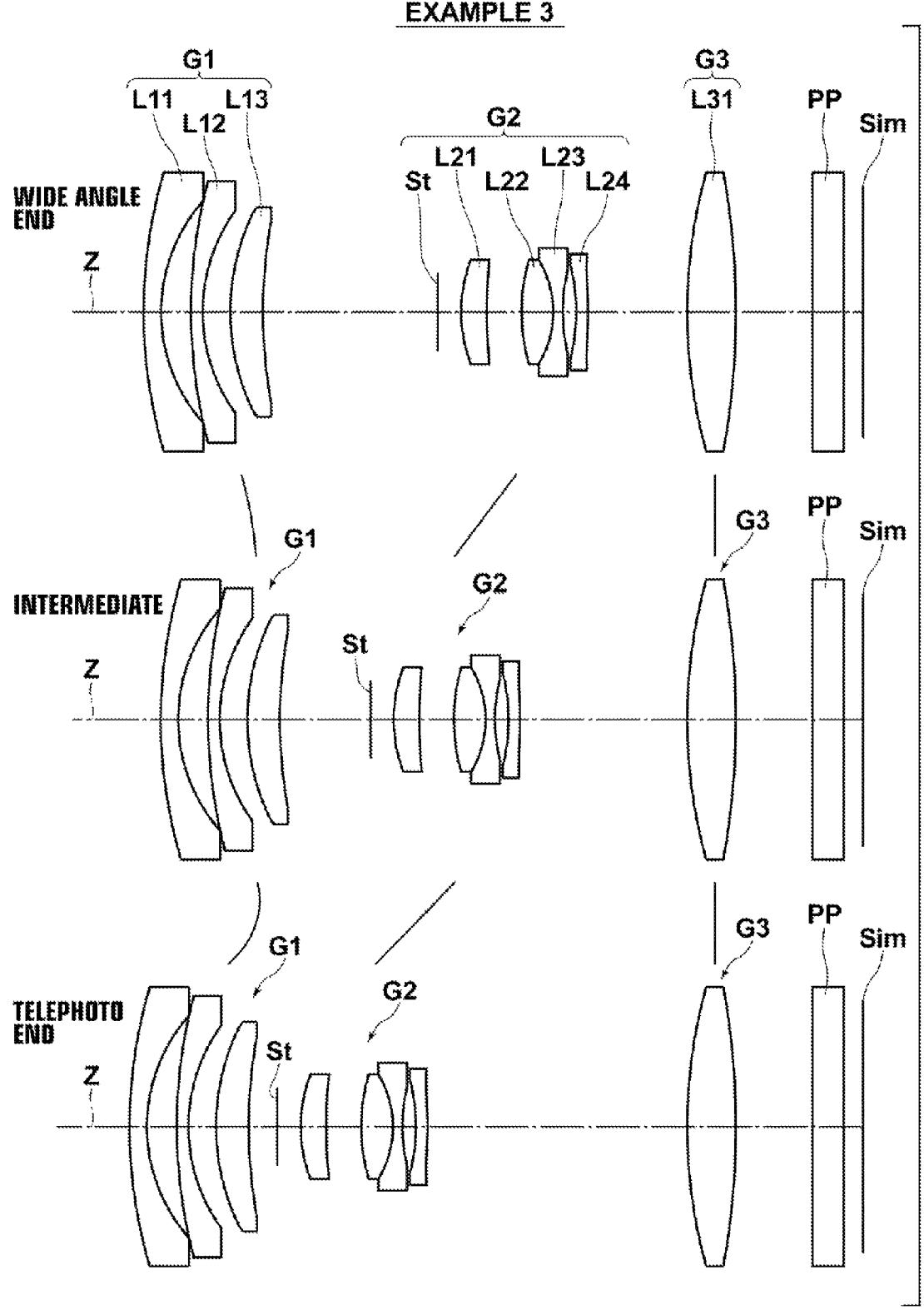
FIG. 3 is a collection of cross-sectional views of a zoom lens according to Example 3 of the present invention, illustrating the lens configuration thereof.
Figure 4:
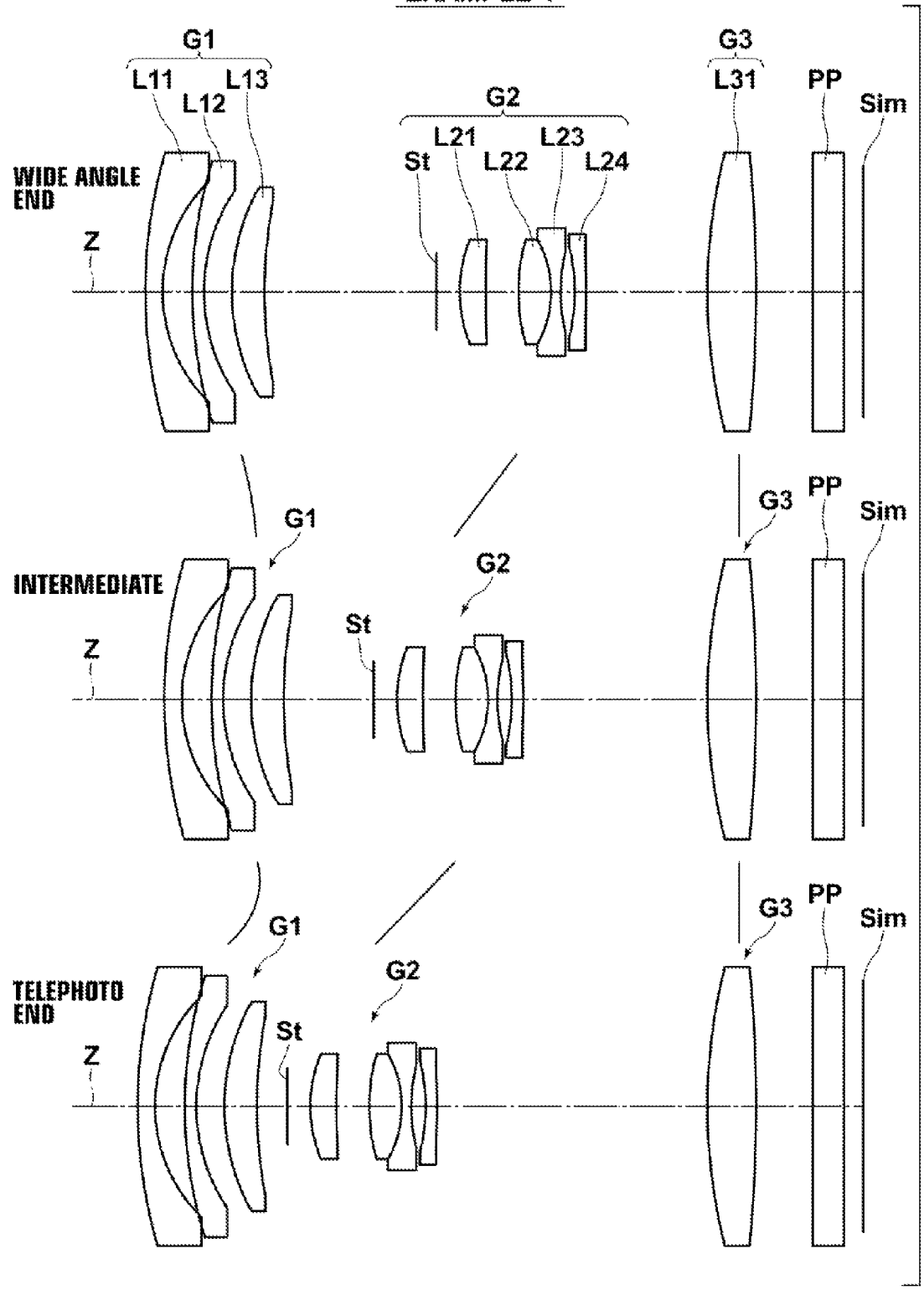
FIG. 4 is a collection of cross-sectional views of a zoom lens according to Example 4 of the present invention, illustrating the lens configuration thereof.
Figure 5:
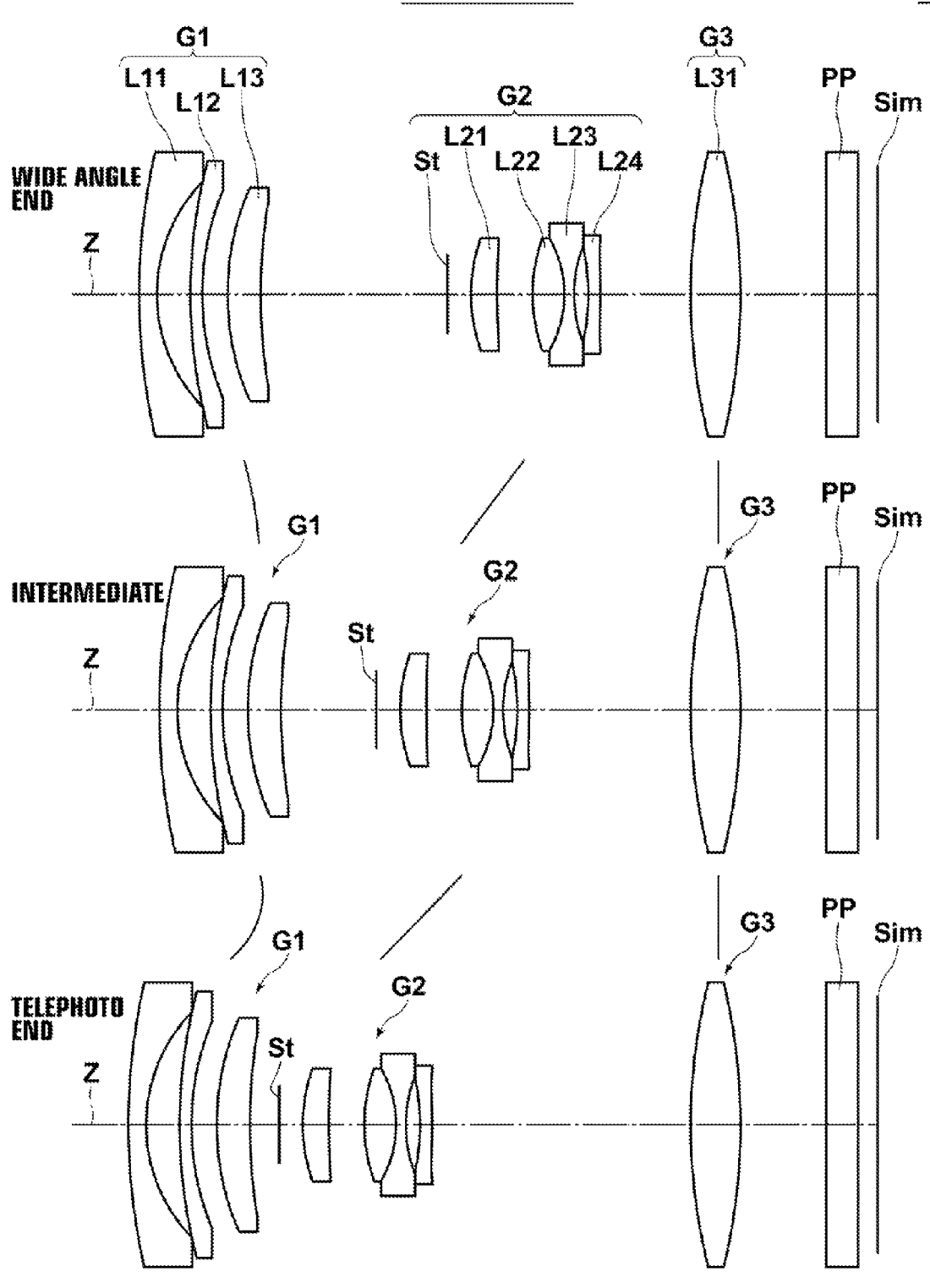
FIG. 5 is a collection of cross-sectional views of a zoom lens according to Example 5 of the present invention, illustrating the lens configuration thereof.

Next, Numerical Examples of the zoom lens of the present invention will be described. A collection of cross-sectional views of a zoom lens according to Example 1 illustrating the lens configuration thereof is shown in FIG. 1. A collection of cross-sectional views of a zoom lens according to Example 2 illustrating the lens configuration thereof is shown in FIG. 2. A collection of cross-sectional views of a zoom lens according to Example 3 illustrating the lens configuration thereof is shown in FIG. 3. A collection of cross-sectional views of a zoom lens according to Example 4 illustrating the lens configuration thereof is shown in FIG. 4. A collection of cross-sectional views of a zoom lens according to Example 5 illustrating the lens configuration thereof is shown in FIG. 5.

Note that in FIGS. 1 through 5, an optical member PP is also shown, and the left side is the object side and the right side is the image side. Further, the aperture stop St shown in the Figures does not necessarily represent the size or shape thereof, but represents the position thereof on the optical axis Z.

Lens data of the zoom lens of Example 1 is shown in Table 1, data related to the distances between surfaces which move is shown in Table 2, and data related to aspherical surface coefficients is shown in Table 3. Lens data of the zoom lens of Example 2 is shown in Table 4, data related to the distances between surfaces which move is shown in Table 5, and data related to aspherical surface coefficients is shown in Table 6. Lens data of the zoom lens of Example 3 is shown in Table 7, data related to the distances between surfaces which move is shown in Table 8, and data related to aspherical surface coefficients is shown in Table 9. Lens data of the zoom lens of Example 4 is shown in Table 10, data related to the distances between surfaces which move is shown in Table 11, and data related to aspherical surface coefficients is shown in Table 12. Further, Lens data of the zoom lens of Example 5 is shown in Table 13, data related to the distances between surfaces which move is shown in Table 14, and data related to aspherical surface coefficients is shown in Table 15.

The meanings of the symbols in the Tables will be described below with reference to Example 1 as an example. The same basically applies to Examples 2 through 5.

In the lens data of Table 1, the i-th (i=1, 2, 3, ...) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column Di. Further, the refractive indices of media between i-th surfaces and (i+1)st surfaces with respect to the d-line (wavelength: 587.6 nm), are shown in the column Ndj. The Abbe numbers of the j-th (j=1, 2, 3, ...) optical elements with respect to the d-line, the value of i sequentially increasing from the surface of the constituent element at the most object side, which is designated as 1, toward the image side are shown in the column vdj.

Here, the sign of the radius of curvature is positive in the case that a surface shape is convex on the object side, and negative in the case that the surface shape is convex on the image side. Basic lens data also shows an aperture stop St and an optical member PP. The column of the surface number of a surface which corresponds to the aperture stop St shows a surface number together with the word "Stop". Moreover, in the lens data of Table 1, the column of each of the distances between surfaces that vary while changing magnification and focusing shows Dn (n is a surface number).

Data related to the distances between surfaces which move in Table 2 show the distance between surfaces Dn (n is a surface number) at each of the wide angle end, the intermediate angle of view, and the telephoto end.

In the lens data, data related to the distances between surfaces which move, degrees are used as the unit of angles and mm is used as the unit of length, but other appropriate units may also be used, as optical systems are usable even when they are proportionally enlarged or miniaturized.

In the lens data of Table 1, the mark "*" is indicated at surface numbers of aspherical surfaces. Numerical values of paraxial radii of curvature are indicated as the radii of curvature of the aspherical surfaces. The data related to aspherical surface coefficients of Table 3 show surface numbers of aspherical surfaces, and aspherical surface coefficients with respect to these aspheric surfaces. The aspherical surface coefficients shows values of respective coefficients K, Ai in the aspherical surface expression (A) below.

$$Z = (Y^2/R)/\{1+(1-K \cdot Y^2/R^2)^{1/2}\} + \Sigma AiY^i \quad (A)$$

where,
Z: the depth of an aspheric surface
Y: the height

R a paraxial radius of curvature
K: an eccentricity
Ai: an aspheric surface coefficient

TABLE 1

Example 1 Lens Data (n. ν is d-line)
f = 14.44~27.23 FNO 4.05~5.66 Angle of View 2ω79.2~43.4 degrees

| Si (Surface Numbers) | Ri (Radii of Curvature) | Di (Distances Between Surfaces) | Ndi (Refractive Indices) | νdj (Abbe Numbers) |
|---|---|---|---|---|
| 1 | 85.1664 | 1.50 | 1.88300 | 40.8 |
| 2* | 15.0000 | 1.53 | 1.00000 | |
| 3* | 18.2748 | 1.00 | 1.84666 | 23.8 |
| 4* | 10.3576 | 2.54 | 1.00000 | |
| 5 | 14.0665 | 2.50 | 2.10205 | 16.8 |
| 6 | 21.0048 | D6 | 1.00000 | |
| 7(Stop) | ∞ | 1.50 | 1.00000 | |
| 8 | 10.9714 | 2.22 | 1.75500 | 52.3 |
| 9 | −179.7518 | 2.18 | 1.00000 | |
| 10 | 156.6142 | 2.53 | 1.88300 | 40.8 |
| 11 | −8.6537 | 0.82 | 1.76182 | 26.5 |
| 12 | 37.2243 | 1.30 | 1.00000 | |
| 13* | −6.4999 | 1.96 | 1.90270 | 31.0 |
| 14* | −9.7159 | D14 | 1.00000 | |
| 15 | 59.2635 | 3.85 | 1.80400 | 46.6 |
| 16 | −52.7463 | 8.21 | 1.00000 | |
| 17 | ∞ | 2.70 | 1.51680 | 64.2 |
| 18 | ∞ | 0.00 | 1.00000 | |

TABLE 2

Example 1 Data Related to Distances

| Distances Between Surfaces | f = 14.44 | f = 19.83 | f = 27.23 |
|---|---|---|---|
| D6 | 15.53 | 8.27 | 2.98 |
| D14 | 8.37 | 14.03 | 21.81 |

TABLE 3

Example 1 Aspherical Surface Data

| Surface Number | K | A3 | A4 | A5 | A6 |
|---|---|---|---|---|---|
| 3* | −5.615024E+00 | 6.864854E−05 | −3.255748E−05 | 8.882220E−07 | 5.057657E−07 |
| 4* | 9.881701E−01 | 6.117427E−05 | −2.173253E−04 | 4.452973E−06 | 8.915804E−07 |
| 13* | −3.736570E−01 | −1.670547E−05 | 1.197682E−04 | 3.091800E−05 | 7.195391E−05 |
| 14* | 1.031390E+00 | −1.101419E−04 | 6.847250E−04 | −6.845574E−06 | 8.052236E−05 |

| Surface Number | A7 | A8 | A9 | A10 | A11 |
|---|---|---|---|---|---|
| 3* | 1.623593E−08 | −1.577554E−09 | −6.924002E−11 | −3.088327E−11 | −1.507678E−12 |
| 4* | 2.270718E−08 | −2.657527E−09 | −5.113041E−10 | −7.221351E−11 | −3.205594E−12 |
| 13* | 1.125338E−07 | −2.138293E−07 | 2.025745E−07 | −1.933534E−08 | −1.142801E−08 |
| 14* | 9.260558E−07 | 1.844839E−07 | −6.465512E−08 | 1.188168E−09 | 1.165727E−09 |

| Surface Number | A12 | A13 | A14 | A15 | A16 |
|---|---|---|---|---|---|
| 3* | 3.842558E−13 | | | | |
| 4* | 6.813147E−13 | | | | |
| 13* | 1.589522E−09 | | | | |
| 14* | −1.505152E−10 | | | | |

TABLE 4

Example 2 Lens Data (n. ν is d-line)
f = 14.45~27.25 FNO 4.05~5.64 Angle of View 2ω79.2~43.8 degrees

| Si (Surface Numbers) | Ri (Radii of Curvature) | Di (Distances Between Surfaces) | Ndi (Refractive Indices) | νdj (Abbe Numbers) |
|---|---|---|---|---|
| 1 | 38.4385 | 1.50 | 1.88300 | 40.8 |
| 2 | 14.0001 | 2.50 | 1.00000 | |
| 3 | 48.3788 | 1.00 | 1.83400 | 37.2 |
| 4 | 17.4456 | 2.21 | 1.00000 | |
| 5 | 17.3992 | 2.80 | 1.92110 | 22.4 |
| 6 | 37.8454 | D6 | 1.00000 | |
| 7(Stop) | ∞ | 2.00 | 1.00000 | |
| 8 | 11.0398 | 2.20 | 1.67003 | 47.2 |
| 9 | −429.2209 | 2.00 | 1.00000 | |
| 10 | 19.3935 | 2.50 | 1.83481 | 42.7 |
| 11 | −11.1129 | 0.81 | 1.76182 | 26.5 |
| 12 | 12.5941 | 1.22 | 1.00000 | |
| 13* | −6.4710 | 1.30 | 1.80348 | 40.4 |
| 14* | −8.3337 | D14 | 1.00000 | |
| 15 | 88.5853 | 4.20 | 1.72916 | 54.7 |
| 16 | −44.1120 | 8.24 | 1.00000 | |
| 17 | ∞ | 2.70 | 1.51680 | 64.2 |
| 18 | ∞ | 0.00 | 1.00000 | |

TABLE 5

Example 2 Related to Distances

| Distances Between Surfaces | f = 14.45 | f = 19.85 | f = 27.25 |
|---|---|---|---|
| D6 | 15.87 | 8.24 | 2.67 |
| D14 | 9.71 | 15.82 | 23.03 |

TABLE 6

Example 2 Aspherical Surface Data

| Surface Number | K | A3 | A4 | A5 | A6 |
|---|---|---|---|---|---|
| 13* | −1.199493E+00 | −1.314139E−05 | −2.406325E−04 | 8.498002E−06 | 2.280640E−05 |
| 14* | 1.040617E−01 | −9.797842E−05 | 5.909294E−04 | 1.515209E−05 | 5.226945E−06 |

| Surface Number | A7 | A8 | A9 | A10 | A11 |
|---|---|---|---|---|---|
| 13* | 1.204939E−06 | 2.879965E−07 | 2.559685E−07 | −6.71121E−09 | −3.432631E−08 |
| 14* | 2.021126E−06 | 7.190726E−07 | −1.451167E−08 | −2.11096E−08 | −1.187111E−09 |

| Surface Number | A12 | A13 | A14 | A15 | A16 |
|---|---|---|---|---|---|
| 13* | 4.316156E−09 | | | | |
| 14* | 2.455661E−10 | | | | |

TABLE 7

Example 3 Lens Data (n, ν is d-line)
f = 14.46~27.26 FNO 3.98~5.61 Angle of View 2ω79.2~43.8 degrees

| Si (Surface Numbers) | Ri (Radii of Curvature) | Di (Distances Between Surfaces) | Ndi (Refractive Indices) | νdj (Abbe Numbers) |
|---|---|---|---|---|
| 1 | 42.2475 | 1.50 | 1.69680 | 55.5 |
| 2 | 14.4153 | 2.57 | 1.00000 | |
| 3 | 43.8813 | 1.00 | 1.92286 | 20.9 |
| 4 | 14.8785 | 2.39 | 1.00000 | |
| 5* | 19.4808 | 2.80 | 2.15400 | 17.2 |
| 6* | 40.7696 | D6 | 1.00000 | |
| 7(Stop) | ∞ | 2.00 | 1.00000 | |
| 8 | 12.5397 | 2.20 | 1.77250 | 49.6 |
| 9 | 44.7736 | 3.00 | 1.00000 | |
| 10 | 16.1165 | 2.73 | 1.81600 | 46.6 |
| 11 | −8.7071 | 0.81 | 1.69895 | 30.1 |
| 12 | 14.5313 | 1.17 | 1.00000 | |
| 13* | −16.0929 | 1.00 | 1.80348 | 40.4 |
| 14* | −38.2489 | D14 | 1.00000 | |
| 15 | 44.7014 | 4.20 | 1.72916 | 54.7 |
| 16 | −66.9137 | 8.25 | 1.00000 | |
| 17 | ∞ | 2.70 | 1.51680 | 64.2 |
| 18 | ∞ | 0.00 | 1.00000 | |

TABLE 8

Example 3 Data Related to Distances

| Distances Between Surfaces | f = 14.46 | f = 19.86 | f = 27.26 |
|---|---|---|---|
| D6 | 15.08 | 7.79 | 2.48 |
| D11 | 8.54 | 14.87 | 22.36 |

TABLE 9

Example 3 Aspherical Surface Data

| Surface Number | K | A3 | A4 | A5 | A6 |
|---|---|---|---|---|---|
| 5* | 3.470260E−02 | 1.495797E−05 | −5.975310E−05 | 4.568279E−05 | −1.061470E−05 |
| 6* | −9.995165E+00 | −9.171688E−05 | 3.548929E−05 | 8.068952E−07 | −1.070761E−06 |
| 13* | −9.644622E+00 | −1.148633E−08 | 7.112957E−04 | −3.317657E−04 | 1.215312E−05 |
| 14* | 3.022983E+00 | −1.106180E−08 | 1.355726E−03 | −3.945132E−04 | 4.443567E−05 |

| Surface Number | A7 | A8 | A9 | A10 | A11 |
|---|---|---|---|---|---|
| 5* | 5.149112E−07 | 1.170447E−07 | −4.851562E−09 | −7.530577E−10 | −1.224280E−10 |
| 6* | −2.406161E−07 | 5.998272E−08 | 5.201876E−09 | 1.075105E−10 | 2.401594E−10 |
| 13* | 9.090754E−06 | 2.692205E−06 | 5.118963E−08 | −1.840184E−07 | −1.056571E−07 |
| 14* | 9.823024E−05 | −1.213117E−07 | −4.064542E−07 | −9.850928E−08 | 2.987408E−09 |

| Surface Number | A12 | A13 | A14 | A15 | A16 |
|---|---|---|---|---|---|
| 5* | 3.762373E−12 | 8.615873E−13 | 1.734482E−13 | 1.117364E−14 | −1.160528E−15 |
| 6* | −6.209544E−12 | 3.256892E−14 | 3.326172E−13 | 1.244328E−14 | 4.552927E−15 |
| 13* | 4.145709E−09 | 1.551470E−09 | 1.206748E−09 | 3.912289E−10 | 1.863227E−11 |
| 14* | 1.041647E−09 | 1.497027E−09 | 6.365804E−11 | 2.434113E−11 | −7.179490E−12 |

| Surface Number | A17 | A18 | A19 | A20 |
|---|---|---|---|---|
| 5* | −2.262130E−16 | −1.851217E−17 | 3.825651E−20 | 2.885440E−19 |
| 6* | −2.621360E−16 | −8.711698E−17 | −1.113907E−17 | 1.658324E−18 |
| 13* | −2.483626E−11 | −2.361438E−12 | −3.048065E−12 | 7.678745E−13 |
| 14* | −1.329278E−12 | −7.830396E−13 | −8.660396E−14 | 5.144799E−14 |

TABLE 10

Example 4 Lens Data (n, ν is d-line)
f = 14.45~27.25 FNO 4.16~5.86 Angle of View 2ω79.2~43.4 degrees

| Si (Surface Numbers) | Ri (Radii of Curvature) | Di (Distances Between Surfaces) | Ndi (Refractive Indices) | νdj (Abbe Numbers) |
|---|---|---|---|---|
| 1 | 42.5272 | 1.50 | 1.88300 | 40.8 |
| 2 | 13.3427 | 2.56 | 1.00000 | |
| 3 | 37.3679 | 1.00 | 1.67300 | 38.1 |
| 4 | 15.6750 | 2.41 | 1.00000 | |
| 5* | 18.3880 | 2.80 | 1.90680 | 21.2 |
| 6* | 38.4066 | D6 | 1.00000 | |
| 7(Stop) | ∞ | 2.00 | 1.00000 | |
| 8 | 11.8526 | 2.22 | 1.69680 | 55.5 |
| 9 | 70.6484 | 2.83 | 1.00000 | |
| 10 | 16.1669 | 2.82 | 1.80400 | 46.6 |
| 11 | −9.1726 | 0.81 | 1.69895 | 30.1 |
| 12 | 14.7213 | 1.23 | 1.00000 | |
| 13* | −16.0250 | 1.00 | 1.80610 | 40.7 |
| 14* | −40.4687 | D14 | 1.00000 | |
| 15 | 48.5679 | 4.20 | 1.83481 | 42.7 |
| 16 | −125.3692 | 6.53 | 1.00000 | |
| 17 | ∞ | 2.70 | 1.51680 | 64.2 |
| 18 | ∞ | 0.00 | 1.00000 | |

TABLE 11

Example 4 Data Related to Distances

| Distances Between Surfaces | f = 14.45 | f = 19.84 | f = 27.25 |
|---|---|---|---|
| D6 | 14.82 | 7.75 | 2.60 |
| D14 | 10.41 | 15.82 | 23.27 |

TABLE 12

Example 4 Aspherical Surface Data

| Surface Number | K | A3 | A4 | A5 | A6 |
|---|---|---|---|---|---|
| 5* | 3.823700E−02 | 2.585157E−05 | −5.880333E−05 | 4.517036E−05 | −1.059660E−05 |
| 6* | −9.964862E+00 | −8.530656E−05 | 3.712343E−05 | 1.513472E−07 | −1.074084E−06 |
| 13* | −9.951800E+00 | −1.207463E−03 | 7.205585E−04 | −3.321443E−04 | 1.214627E−05 |
| 14* | 3.006434E+00 | −1.147538E−03 | 1.386331E−03 | −3.935216E−04 | 4.444880E−05 |

| Surface Number | A7 | A8 | A9 | A10 | A11 |
|---|---|---|---|---|---|
| 5* | 5.155070E−07 | 1.170514E−07 | −4.861699E−09 | −7.580617E−10 | −1.224281E−10 |
| 6* | −2.400687E−07 | 6.000583E−08 | 5.202450E−09 | 1.075213E−10 | −2.401593E−10 |
| 13* | 9.090676E−06 | 2.692204E−06 | 6.113962E−08 | −1.840184E−07 | −1.056571E−07 |
| 14* | 9.828141E−05 | −1.213109E−07 | −4.064542E−07 | −9.850928E−08 | 2.937408E−09 |

| Surface Number | A12 | A13 | A14 | A15 | A16 |
|---|---|---|---|---|---|
| 5* | 3.762370E−12 | 8.615873E−13 | 1.734482E−13 | 1.117364E−14 | −1.160528E−15 |
| 6* | −6.209542E−12 | 3.256895E−14 | 3.326172E−13 | 1.244328E−14 | 4.552927E−15 |
| 13* | 4.145709E−09 | 1.551470E−09 | 1.206748E−09 | 3.912289E−10 | 1.863227E−11 |
| 14* | 1.041647E−09 | 1.497027E−09 | 6.865804E−11 | 2.484113E−11 | −7.179490E−12 |

| Surface Number | A17 | A18 | A19 | A20 |
|---|---|---|---|---|
| 5* | −2.262130E−16 | −1.851217E−17 | 3.825651E−20 | 2.885440E−19 |
| 6* | −2.621360E−16 | −8.711698E−17 | −1.113907E−17 | 1.658324E−18 |
| 13* | −2.483626E−11 | −2.361438E−12 | −3.048065E−12 | 7.678745E−13 |
| 14* | −1.329278E−12 | −7.830396E−13 | −8.650396E−14 | 5.144799E−14 |

TABLE 13

Example 5 Lens Data (n, ν is d-line)
f = 14.46~27.26 FNO 4.04~5.73 Angle of View 2ω79.2~43.8 degrees

| Si (Surface Numbers) | Ri (Radii of Curvature) | Di (Distances Between Surfaces) | Ndi (Refractive Indices) | νdj (Abbe Numbers) |
|---|---|---|---|---|
| 1 | 54.3826 | 1.50 | 1.83300 | 40.8 |
| 2 | 13.6382 | 2.83 | 1.00000 | |
| 3 | 43.9985 | 1.00 | 1.51742 | 52.4 |
| 4 | 22.7515 | 2.14 | 1.00000 | |
| 5* | 22.7043 | 2.80 | 1.92110 | 22.4 |
| 6* | 46.1814 | D6 | 1.00000 | |
| 7(Stop) | ∞ | 2.00 | 1.00000 | |
| 8 | 14.1578 | 2.20 | 1.80400 | 46.6 |
| 9 | 80.4110 | 3.00 | 1.00000 | |
| 10 | 14.0681 | 2.68 | 1.81600 | 46.6 |
| 11 | −9.4979 | 0.81 | 1.71736 | 29.5 |
| 12 | 11.2063 | 1.21 | 1.00000 | |
| 13* | −18.0479 | 1.00 | 1.74330 | 49.3 |
| 14* | −51.5125 | D14 | 1.00000 | |
| 15 | 49.7376 | 4.20 | 1.72916 | 54.7 |
| 16 | −51.7165 | 8.90 | 1.00000 | |
| 17 | ∞ | 2.70 | 1.51680 | 64.2 |
| 18 | ∞ | 0.00 | 1.00000 | |

TABLE 14

Example 5 Data Related to Distances

| Distances Between Surfaces | f = 14.46 | f = 19.86 | f = 27.528 |
|---|---|---|---|
| D6 | 15.78 | 8.07 | 2.46 |
| D14 | 7.65 | 13.64 | 21.87 |

TABLE 15

Example 4 Aspherical Surface Data

| Surface Number | K | A3 | A4 | A5 | A6 |
|---|---|---|---|---|---|
| 5* | −7.413515E−01 | −2.098204E−05 | −6.213790E−05 | 4.629785E−05 | −1.071012E−05 |
| 6* | −8.588679E+00 | −8.241494E−05 | 2.116167E−05 | −4.202121E−07 | −6.486849E−07 |
| 13* | −9.998498E+00 | −1.029634E−03 | 8.185040E−04 | −3.301257E−04 | 1.227960E−05 |
| 14* | −4.191034E+00 | −1.002237E−03 | 1.361981E−03 | −3.889624E−04 | 4.509856E−05 |

| Surface Number | A7 | A8 | A9 | A10 | A11 |
|---|---|---|---|---|---|
| 5* | 5.310545E−07 | 1.197088E−07 | −4.719902E−09 | −7.699852E−10 | −1.272929E−10 |
| 6* | −2.188644E−07 | 5.875557E−08 | 4.889158E−09 | 6.833959E−11 | −2.434408E−10 |
| 13* | 9.119539E−06 | 2.656839E−08 | 3.357793E−08 | −1.905096E−07 | −1.056367E−07 |
| 14* | 9.700694E−06 | −1.951435E−07 | −4.147801E−07 | −9.769828E−08 | 3.427927E−09 |

| Surface Number | A12 | A13 | A14 | A15 | A16 |
|---|---|---|---|---|---|
| 5* | 3.050391E−12 | 4.944909E−13 | 1.731993E−13 | 1.192082E−14 | −9.877713E−16 |
| 6* | −6.412978E−12 | 3.686216E−14 | 3.352781E−13 | 1.853794E−14 | 4.705880E−15 |
| 13* | 4.464429E−09 | 1.700330E−09 | 1.256590E−09 | 3.973397E−10 | 1.733613E−11 |
| 14* | 1.155020E−09 | 1.530347E−09 | 7.365946E−11 | 2.377115E−11 | −7.758491E−12 |

| Surface Number | A17 | A18 | A19 | A20 |
|---|---|---|---|---|
| 5* | −2.042268E−16 | −1.661515E−17 | 4.840589E−21 | 2.287756E−19 |
| 6* | −2.389036E−16 | −8.582582E−17 | −1.126781E−17 | 1.582510E−18 |
| 13* | −2.580557E−11 | −2.539767E−12 | −3.087593E−12 | 7.879966E−13 |
| 14* | −1.583186E−12 | −8.653928E−13 | −3.704819E−14 | 4.658118E−14 |

Values corresponding to conditional formulas (1) through (10) of the zoom lenses of Examples 1 through 5 are shown in Table 16. Note that all of the Examples are based on the d-line as a reference wavelength. The values shown in Table 16 below are based on the reference wavelength.

TABLE 16

| Expression Numbers | Conditional Formulas | Example 1 | Example 2 | Example 3 | Example 4 | Example 5 |
|---|---|---|---|---|---|---|
| (1) | D45/f2 | 0.108 | 0.097 | 0.147 | 0.146 | 0.140 |
| (2) | |f1|/fw | 1.930 | 1.874 | 1.895 | 1.749 | 2.005 |
| (3) | |f1|/ft | 1.024 | 0.994 | 1.005 | 0.928 | 1.063 |
| (4) | f2/fw | 1.395 | 1.423 | 1.415 | 1.345 | 1.476 |
| (5) | f2/ft | 0.740 | 0.755 | 0.751 | 0.713 | 0.783 |
| (6) | BF/fw | 0.692 | 0.694 | 0.694 | 0.575 | 0.738 |
| (7) | BF/ft | 0.367 | 0.368 | 0.368 | 0.305 | 0.392 |
| (8) | N13 | 2.102 | 1.921 | 2.154 | 1.907 | 1.921 |
| (9) | Lw/fw | 4.171 | 4.343 | 4.283 | 4.278 | 4.314 |
| (10) | Lt/ft | 2.245 | 2.308 | 2.317 | 2.293 | 2.322 |

The respective aberration diagrams of the imaging lens of Example 1 are shown in A through L of FIG. 6. A through D of FIG. 6 respectively show spherical aberration, astigmatism, distortion, and lateral chromatic aberration at the wide angle end. E through H of FIG. 6 respectively show spherical aberration, astigmatism, distortion, and lateral chromatic aberration at the intermediate angle of view. I through L of FIG. 6 respectively show spherical aberration, astigmatism, distortion, and lateral chromatic aberration at the telephoto end.

The aberration diagrams respectively showing spherical aberration, astigmatism, distortion, and lateral chromatic aberration represent the d-line (a wavelength of 587.6 nm) as a reference wavelength. The spherical aberration diagram shows aberrations with respect to the d-line (a wavelength of 587.6 nm) indicated by a solid line, and further shows aberrations with respect to a wavelength of 460.0 nm and a wavelength of 615.0 nm respectively indicated by a dashed line and a two-dot line. In the astigmatism diagrams, the solid line illustrates astigmatism in the sagittal direction while a broken line illustrates astigmatism in the tangential direction.

Similarly, the respective aberration diagrams of the imaging lens of Example 2 are shown in A through L of FIG. 7. The respective aberration diagrams of the imaging lens of Example 3 are shown in A through L of FIG. 8. The respective aberration diagrams of the imaging lens of Example 4 are shown in A through L of FIG. 9. The respective aberration diagrams of the imaging lens of Example 5 are shown in A through L of FIG. 10.

It can be understood from the data shown above that all of the zoom lenses of Examples 1 through 5 satisfy conditional formulas (1) through (10) and are zoom lenses which are fast even at the telephoto end and maintain favorable performance.

Figure 11:
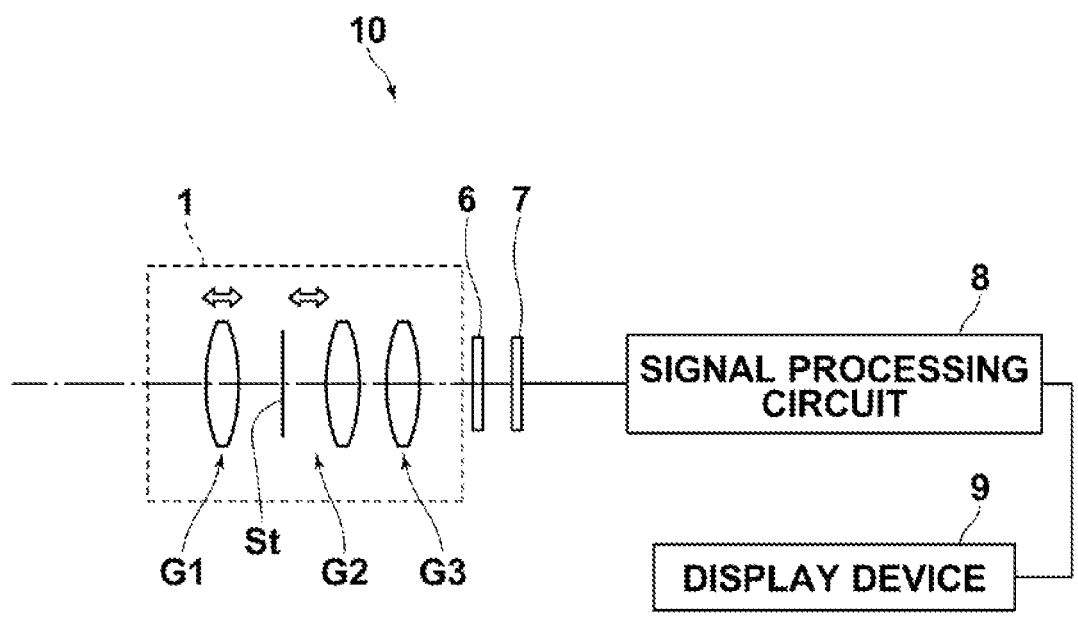
FIG. 11 is a schematic configuration diagram of an imaging apparatus according to an embodiment of the present invention.

Next, the imaging apparatus according to the embodiment of the present invention will be described. FIG. 11 shows a schematic configuration diagram of an imaging apparatus including the zoom lens of the embodiment of the present invention as one example of the imaging apparatus of the embodiment of the present invention. Note that FIG. 11 schematically shows the first lens group G1 through the third lens group G3, which are included in the zoom lens 1.

The imaging apparatus 10 is provided with a zoom lens 1: a filter 6, which functions as a low pass filter and the like, disposed on the image side of the zoom lens 1: an imaging element 7 disposed on the image side of the filter 6; and a signal processing circuit 8. The imaging element 7 converts optical images formed by the zoom lens 1 into electric signals. For example, a CCD (Charge Coupled Device), a CMOS (Complementary Metal Oxide Semiconductor), or the like can be employed as the imaging element 7. The imaging element 7 is disposed such that the imaging surface thereof corresponds to the imaging surface of the zoom lens 1.

The images photographed by the zoom lens 1 is formed on the imaging surface of the imaging element 7 and output signals related to the images from the imaging element 7 are computed by the signal processing circuit 8. Then, the images are displayed on the display device 9.

Note that FIG. 11 shows a single-plate type imaging apparatus in which one imaging element 7 is employed. The imaging apparatus of the present invention may be a three-plate type that employs three imaging elements respectively corresponding to the respective colors, in which a color separation prism that separates light beams into the respective colors R (red), G (green), and B (blue) is disposed between the zoom lens 1 and the imaging element 7.

The present invention has been described with reference to the embodiments and Examples. The zoom lens of the present invention is not limited to the Examples described above, and various modifications are possible. For example, values, such as the radius of curvature, the distances between surfaces, the refractive indices, the Abbe numbers, and the aspherical surface coefficients of each lens component are not limited to the values shown in the Numerical Examples above, but may be other values.

What is claimed is:

1. A zoom lens substantially consisting of a first lens group having a negative refractive power, a second lens group having a positive refractive power, and a third lens group having a positive refractive power in this order from the object side, a stop being provided within the second lens group and only the first lens group and the second lens group being moved to change magnification; wherein
   the first lens group substantially consists of an L11 negative lens with a concave surface toward the image side, an L12 negative lens with a concave surface toward the image side, and an L13 positive lens with a convex surface toward the object side in this order from the object side;
   the second lens group substantially consists of a stop, an L21 positive lens with a convex surface toward the object side, a cemented lens having a positive refractive power as a whole which is formed by an L22 positive lens with a convex surface toward the object side and an L23 negative lens with a concave surface toward the image side together, and an L24 negative lens with a convex surface toward the image side, having at least one aspherical surface, in this order from the object side; wherein
the third lens group substantially consists of an L31 positive lens; and
   conditional formula below is satisfied:

$$1.85 < N13 \quad (8),$$ where

N13: the refractive index with respect to the d-line of the L13 positive lens.

2. The zoom lens of claim 1, wherein conditional formula below is satisfied:

$$0.07 < D45/f2 < 0.20 \quad (1),$$ where

D45: the air space along the direction of the optical axis between the L21 positive lens and the L22 positive lens; and
f2: the focal length of the second lens group.

3. The zoom lens of claim 2, wherein conditional formula below is satisfied:

$$0.09 < D45/f2 < 0.16 \quad (1a).$$

4. The zoom lens of claim 1, wherein conditional formulas below are satisfied:

$$1.60 < |f1|/fw < 2.20 \quad (2)$$

$$0.85 < |f1|/ft < 1.20 \quad (3)$$

$$1.20 < f2/fw < 1.60 \quad (4)$$

$$0.60 < f2/ft < 0.90 \quad (5),$$ where fw: the focal length of the entire zoom lens system at the wide angle end;
ft: the focal length of the entire zoom lens system at the telephoto end;
f1: the focal length of the first lens group; and
f2: the focal length of the second lens group.

5. The zoom lens of claim 4, wherein conditional formulas below are satisfied:

$$1.70 < |f1|/fw < 2.10 \quad (2a)$$

$$0.90 < |f1|/ft < 1.10 \quad (3a)$$

$$1.30 < f2/fw < 1.50 \quad (4a)$$

$$0.70 < f2/ft < 0.80 \quad (5a).$$

6. The zoom lens of claim 1, wherein conditional formulas below are satisfied:

$$0.50 < BF/fw < 0.90 \quad (6)$$

$$0.25 < BF/ft < 0.45 \quad (7),$$ where fw: the focal length of the entire zoom lens system at the wide angle end;
ft: the focal length of the entire zoom lens system at the telephoto end; and
BF: the back focus of the entire lens system.

7. The zoom lens of claim 6, wherein conditional formulas below are satisfied:

$$0.55 < BF/fw < 0.80 \quad (6a)$$

$$0.30 < BF/ft < 0.40 \quad (7a).$$

8. The zoom lens of claim 1, wherein conditional formula below is satisfied:

$$1.90 \leq N13 \quad (8a).$$

9. The zoom lens of claim 1, wherein conditional formulas below are satisfied:

$$3.5 < Lw/fw < 5.0 \quad (9)$$

$$1.9 < Lt/ft < 2.7 \quad (10),$$ where fw: the focal length of the entire zoom lens system at the wide angle end;
ft: the focal length of the entire zoom lens system at the telephoto end;
Lw: the total lens length of the entire zoom lens system at the wide angle end; and
Lt: the total lens length of the entire zoom lens system at the telephoto end.

10. The zoom lens of claim 9, wherein conditional formulas below are satisfied:

$$4.0<Lw/fw<4.5 \quad (9a)$$

$$2.1<Lt/ft<2.5 \quad (10a).$$

11. The zoom lens of claim 1, wherein focusing to a close distance is performed by moving the first lens group.

12. An imaging apparatus comprising:
the zoom lens of claim 1.

* * * * *